United States Patent [19]

Fosnaugh et al.

[11] Patent Number: 4,785,144
[45] Date of Patent: Nov. 15, 1988

[54] HORN BLOWING SWITCH ARRANGEMENT

[75] Inventors: Harland R. Fosnaugh, Springboro; Mark T. Winters, Centerville, both of Ohio

[73] Assignee: General Motors Corporation, Detroit, Mich.

[21] Appl. No.: 155,973

[22] Filed: Feb. 16, 1988

[51] Int. Cl.[4] .................. H01H 9/00; B60R 21/08
[52] U.S. Cl. ................. 200/61.55; 280/731; 280/735
[58] Field of Search ............... 180/271; 280/731, 735, 280/740; 200/61.54–61.57; 307/10 R

[56] References Cited

U.S. PATENT DOCUMENTS 2,179,653  11/1939  Weil ............................ 200/61.56
2,286,016  6/1942  Sladky ......................... 200/61.56
3,712,968  1/1973  Bonn et al. ................... 200/61.56
3,819,205  6/1974  Dunford et al. ............. 280/735 X
4,325,568  4/1982  Clark et al. ................... 280/731

Primary Examiner—J. R. Scott
Attorney, Agent, or Firm—Herbert Furman

[57] ABSTRACT

A horn blowing switch arrangement includes a supported mounted within the hub portion of a steering wheel and having a plurality of bolts, each of which supports a sleeve member. The bolts thread into an inflatable restraint module and springs between the support and the restraint module space the sleeves from the support. Depression of the restraint module engages the sleeve members with the support to complete a circuit across a source of power and blow the vehicle horn.

7 Claims, 2 Drawing Sheets

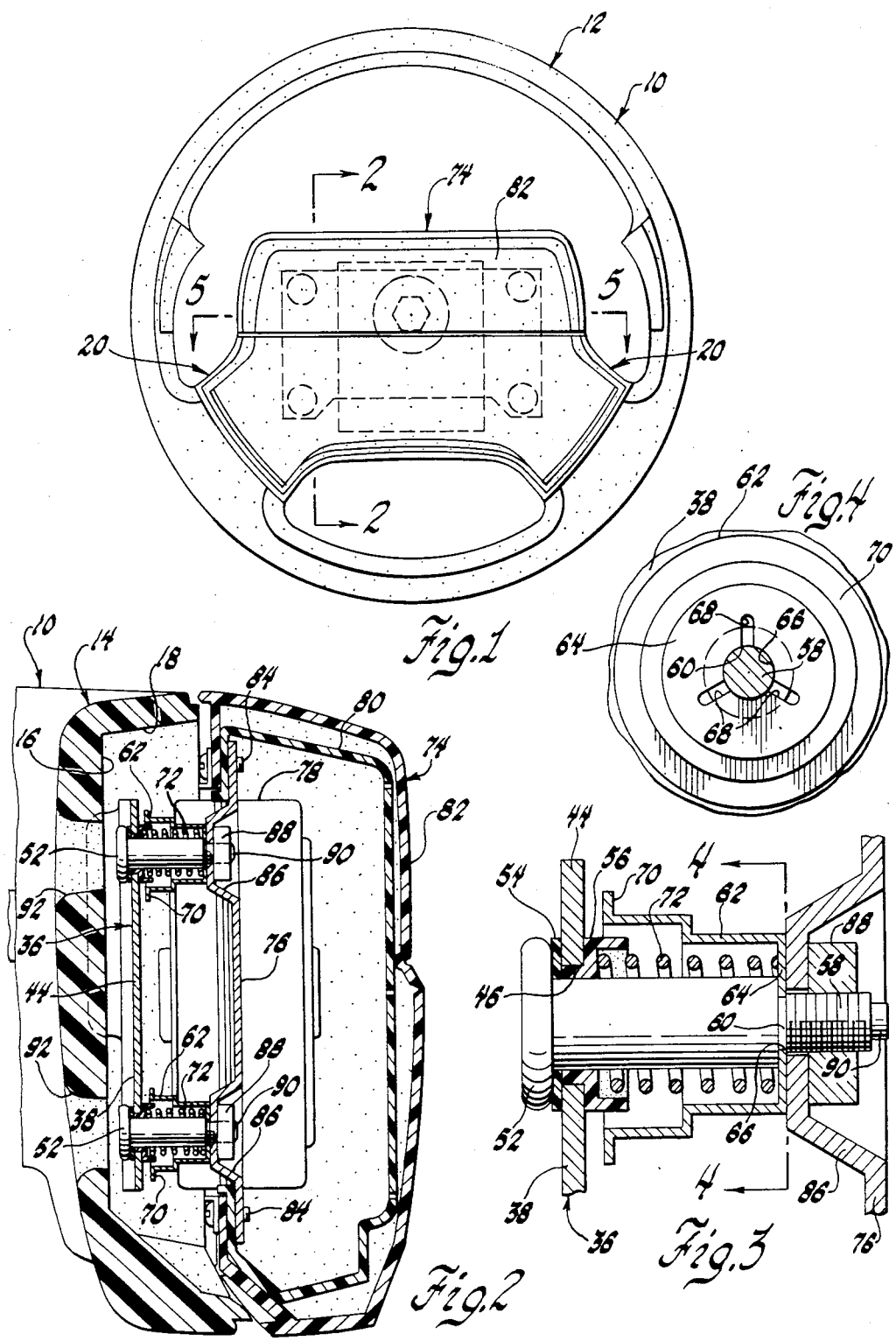

HORN BLOWING SWITCH ARRANGEMENT

BACKGROUND OF THE INVENTION

This invention relates generally to horn blowing switch arrangements and more particularly to a horn blowing switch arrangement for a vehicle steering wheel having an inflatable occupant restraint module.

Horn blowing switch arrangements for steering wheels having inflatable occupant restraint modules are known. U.S. Pat. Nos. 3,819,205 Dunford et al and 4,325,568 Clark et al, both assigned to the assignee of this invention, disclose such arrangements. In both of these arrangements, the horn blowing switches are mounted on the module and are manually depressible by the driver when the driver desires to blow the vehicle horn.

It is also known to provide a horn blowing switch arrangement between the module and the hub of the steering wheel. In such arrangement, the module and support brackets underlying opposite sides of the module are slidably secured to cantilevered steel springs mounted to the hub of the steering wheel by headed bolts extending through the steel springs and threaded into the module. Compression springs seat between the hub of the steering wheel and the support brackets to locate the bolt heads in engagement with the cantilevered springs. A contact on each support bracket is engageable with a plate in the hub of the steering wheel to complete a circuit across a source of power and the vehicle horn when one side of the module is depressed toward the hub of the steering wheel.

The arrangement of this invention includes a switch module which is mounted between the occupant restraint module and the hub of the steering wheel and which mounts the restraint module to the steering wheel. The switch module to blow the horn is actuated when the restraint module is manually depressed. The arrangement of this invention has several features which provide for ease of assembly as well as ease of access for repair when necessary.

In the preferred embodiment of the invention, the restraint module is supported at the corners thereof by a number of self contained switches which are part of a switch module mounted to the hub of the steering wheel. The occupant restraint module is of conventional type and includes a base plate which mounts the inflator and the cushion, a container for the cushion, and an outer covering over the container. The switch module mounts the occupant restraint module to the steering wheel in covering relationship thereto after the switch module has been mounted within the hub of the steering wheel. Thus the steering wheel and switch module can be mounted to the steering column during the normal assembly process of the vehicle and the occupant restraint module can then be later mounted to the steering wheel.

The primary feature of this invention is that it provides an improved horn blowing switch arrangement for vehicle steering wheels having inflatable occupant restraint modules. Another feature is that the switch arrangement includes a switch module which supports the restraint module within the hub of the steering wheel at a plurality of mounting points so that the restraint module cannot slide or move laterally of itself when depressed to blow the vehicle horn. A further feature is that the switch module is a self-contained unit which can be mounted to the steering wheel prior to assembly of the steering wheel to the vehicle steering column. Yet another feature is that the restraint module can be easily assembled to and disassembled from the switch module.

BRIEF DESCRIPTION OF THE DRAWINGS

These and other features will be readily apparent from the following specification and drawings wherein:

FIG. 1 is a plan view of a vehicle steering wheel having an inflatable occupant restraint module and a horn blowing switch arrangement according to this invention.

FIG. 2 is an ennlarged sectional view taken generally along line 2—2 of FIG. 1.

FIG. 3 is an enlarged view of a portion of FIG. 2.

FIG. 4 is a view taken along line 4—4 of FIG. 3.

DESCRIPTION OF THE PREFERRED EMBODIMENT

Figure 5:
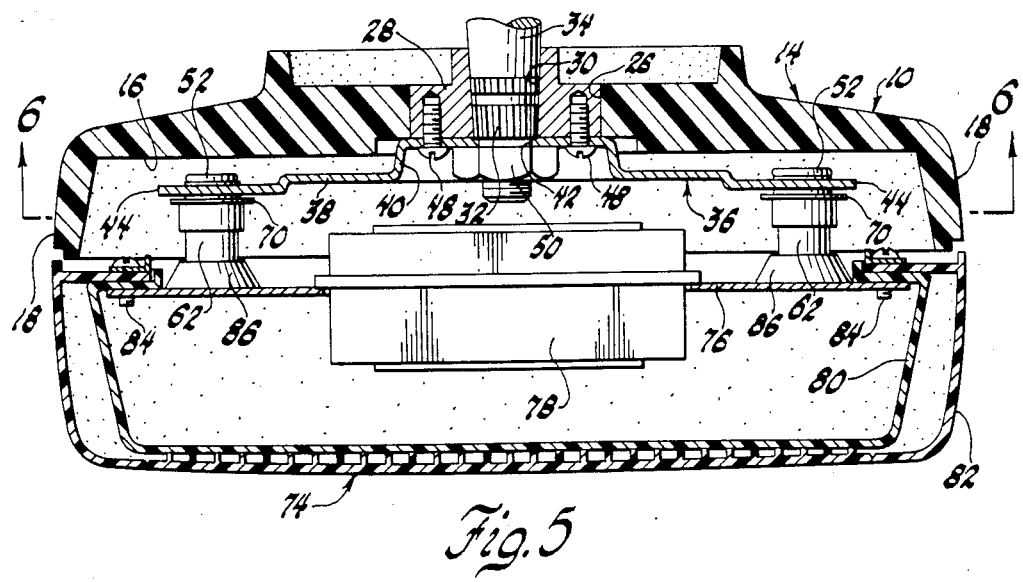
FIG. 5 is an enlarged view taken along line 5—5 of FIG. 1.

Referring now to the drawings, a vehicle steering wheel designated generally 10 includes an outer generally circular rim portion 12 and a hub portion 14 which is generally rectangular in shape and provided with a base wall 16 and a side wall 18. The hub portion 14 is joined to the rim portion 12 by spoke portions 20 which have base walls 22 continuing the base wall 16 of the hub portion 14 and side walls 24 continuing the side walls 18 of the hub portion. Walls 22 and 24 terminate at the rim portion 12.

The base wall 16 of hub portion 14 is apertured at 26, FIG. 5, and receives an insert 28 which is conventionally fixed thereto. This insert is provided with a tapered splined bore 30 which receives a complementary shaped upper end 32 of the steering shaft 34 when the steering wheel 10 is mounted to the steering column, not shown, as will be further described.

Figure 6:
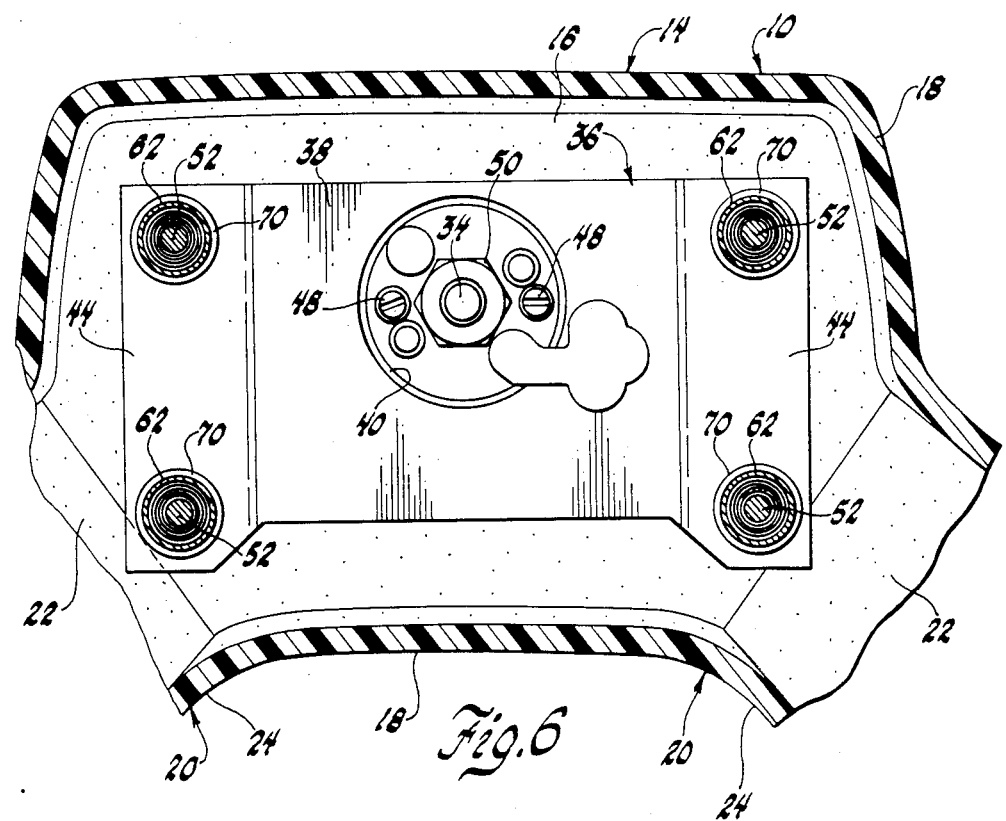
FIG. 6 is a view taken along 6—6 of FIG. 5.

The horn blowing switch arrangement designated generally 36 includes a support plate 38 which is generally rectangular in shape, FIG. 6, and includes a circular depression 40 which is centrally apertured at 42, FIG. 5. The plate 38 has end portions 44 which are offset upwardly from the normal plane of the plate and each of which is apertured at the corners thereof at 46, FIG. 3. The base wall of the depression 40 seats on the insert 28 and is secured thereto by bolts 48, FIGS. 5 and 6. Further, a nut 50 which secures the steering wheel 10 to the threaded end of steering shaft 34 also clamps the depression 40 to insert 28.

As best shown in FIG. 3, a headed bolt 52 extends upwardly through each of the openings 46 at the corners of plate 38. A flat insulating washer 54 and an offset flanged insulating washer 56 insulate the head and the shank of bolt 52 from plate 38. The bolt 52 includes a threaded end 58 which is joined to the shank of the bolt by a radial groove 60. A cylindrically stepped sleeve member 62 of metal includes a base wall 64, FIG. 4, provided with an aperture 66 and a series of slots 68 extending radially of the aperture so that the base wall intermediate the slots is deflectable. This permits the sleeve member 62 to be threaded over the threaded end 58 of bolt 52 until it snaps into groove 60 so that the sleeve member is thereafter axially fixed and freely rotatable relative to the bolt. The lower stepped portion or skirt portion of the sleeve member 62 includes a radial terminal flange 70 which is spaced from plate 38 by a coil compression spring 72 seated between a radial flange of washer 56 and the base wall 64 of the sleeve member 62.

The plate 38, bolts 52, the washers 54 and 56, the sleeves 62 and the springs 72 are assembled to each other to provide a switch module which can be mounted to the insert 28 of the steering wheel by bolts 48 prior to the steering wheel being mounted to the shaft 34.

An inflatable occupant restraint module 74 covers the openings of the hub portion 14 and spoke portions 20 defined by walls 18 and 24. The module is conventional and generally includes a base plate 76 which mounts an inflator 78 and a cushion, not shown. The plate 76, the inflator 78 and the cushion are encapsulated in a container 80. An outer soft cover 82 encapsulates the container, with the flanges of the cover 82 and container 80 being bolted at 84 to the plate 76 to assemble the module 74. The plate 76 includes four tapered truncated embossments 86, each of which is apertured to receive the threaded end 58 of a bolt 52 therethrough. A nut 88 is welded or otherwise secured to the base wall of each embossment in alignment with the aperture therethrough.

After the switch module has been mounted to the steering wheel and the steering wheel mounted to the steering shaft, as previously described, the restraint module 74 is then fitted over the openings of the hub and spoke portions with the pilot portions 90 of bolts 52 within nuts 88. A screwdriver or other tool matching a recess in the head of bolt 52 is then inserted through each opening 92 in the base wall 16 of the hub portion to rotate each bolt 52 and thread the bolts into nuts 88. This mounts the module 74 to the steering wheel. The switch module and restraint module provide the switch arrangement. Each opening 92 is in alignment with a bolt 52.

If the driver desires to blow the vehicle horn, the driver presses the restraint module 74 downwardly within the steering wheel. This closes at least two of the flanges 70 of two of the sleeve members 62 against support plate 38 to complete a circuit across a source of power, the vehicle horn(s), plate 38 and bolts 52. The bolts 52 slide relative to washers 54 and 56 as the restraint module 74 moves within the steering wheel. Since the module 74 is supported at the corners thereof, it is not possible for the module to move laterally relative to the steering wheel as it is pressed within the wheel. Any one side of the module 74 or the entire module 74 can be pressed downwardly by the driver to blow the vehicle horn. Thus, the multiple point mounting of the module 74 provides for a smooth horn blowing movement of the module, without binding and attendant wear.

If at any time removal of the module 74 is desired or access to the switch module is desired, the bolts 52 can be threaded out of nuts 88 to permit removal of the module 74 and access to the switch module. Further, if removal of the switch module is desired, bolts 48 and nut 50 can thereafter be removed to permit removal of the switch module without requiring disassembly of the steering wheel from the steering column.

Thus this invention provides an improved horn blowing switch arrangement for vehicle steering wheels having inflatable occupant restraint modules.

The embodiments of the invention in which an exclusive property or privilege is claimed are defined as follows:

1. In combination with a vehicle steering wheel including a hub portion and a rim portion, and an inflatable restraint module, a horn blowing switch arrangement comprising, a support fixed within the hub portion of the steering wheel and including a plurality of spaced apertures therethrough aligned with corresponding apertures through the hub portion, a headed post member slidably received through each aperture of the support, means insulating the post members from the support, cooperating means on the module and the free end portions of the post members to fix the module to the post members for movement as a unit relative to the support, a sleeve member respective to and surrounding each post member, means fixing one end of each sleeve member to a respective post member, resilient means operative between the support and the module to engage the head portions of the post members with the support and space the other end of each sleeve member from the support, and a source of power connected across the sleeve members and the support, manual engagement of the module by the driver with sufficient force to overcome the resilient means engaging the other ends of the sleeve members with the support to complete a circuit across the source of power.

2. In combination with a vehicle steering wheel including a hub portion and a rim portion, and an inflatable restraint module, a horn blowing switch arrangement comprising, a switch module including a multi-cornered support secured to the hub portion of the steering wheel, the support including an aperture at each corner thereof, a post member slidable in each aperture of the support, means securing the restraint module to the post members for movement therewith as a unit relative to the support, resilient means operative between the support and the restraint module to bias the restraint module in a direction away from the support, means insulating the resilient means from the support, means limiting movement of the restraint module away from the support to locate the restraint module a predetermined distance from the support under the bias of the resilient means, a contact member surrounding each post member and extending from the restraint module toward the support less than the predetermined distance, and a source of power connected across the contact members and the support, manual engagement of the restraint module by the driver with sufficient force to overcome the bias of the resilient means moving the restraint module toward the support to engage the contact members with the support and complete a circuit across the source of power as the post members slide relative to the support.

3. In combination with a vehicle steering wheel including a hub portion and a rim portion, and an inflatable restraint module, a horn blowing switch arrangement comprising, a multi-apertured support secured to the hub portion of the steering wheel, a series of linear guide members secured to the restraint module and slidable in the apertures of the support to guide linear movement of the restraint module toward and away from the support, means insulating the guide members from the support, resilient means operative between the support and the restraint module to bias the restraint module away from the support, means limiting movement of the restraint module away from the support to locate the restraint module a predetermined distance from the support under the bias of the resilient means, a contact member respective to each guide member and extending from the restraint module toward the support less than the predetermined distance, means insulating the contact members from the support, and a source of power connected across the contact members and the support, manual engagement of the restraint module by the driver with sufficient force to overcome the bias of the resilient means moving the restraint module and guide members relative the support to engage the contact members with the support and complete a circuit across the source of power as the post members slide relative to the support.

4. The combination comprising,
   a vehicle steering wheel including an open hub portion provided with a series of apertures therethrough and a rim portion,
   a horn blowing switch module, including a support having a series of apertures alignable with the hub portion apertures, a headed post member extending through each aperture of the support, a skirted contact member mounted on each post member adjacent the free end portion thereof, resilient means operative between the support and each contact member biasing the head portion of each post member into engagement with the support and spacing the skirt of the respective contact member a predetermined distance from the support, means insulating the contact members from the support, and a source of power connected across the support and the contact members,
   means mounting the horn blowing switch module within the hub portion of the steering wheel with the post member heads aligned with the hub portion apertures,
   an inflatable restraint module located over the support and closing the opening of the hub portion, the restraint module including a series of anchor means alignable with the free end portions of the post members and connectable therewith to mount the inflatable restraint module to the support, the apertures in the hub portion of the steering wheel providing tool access to the heads of the post members to connect the post members and anchor means.

5. The combination received in claim 4 wherein the post members and contact members are electrically connected and the insulating means insulates the post members from the support.

6. The combination comprising,
   a vehicle steering wheel including an open hub portion provided with a series of apertures therethrough and a rim portion,
   a horn blowing switch module, including a support having a series of apertures alignable with the hub portion apertures, a post member extending through each aperture of the support and including a headed one end portion having the head thereof engageable with one side of the support and a threaded other end portion, a tubular contact member surrounding each post member, means on one end portion of each contact member cooperable with the threaded other end portion of a respective post member to mount the contact member thereto, resilient means operative between the support and each contact member biasing the head portion of each post member into engagement with the one side of the support and spacing the other end portion of each contact member a predetermined distance from the other side of the support, means insulating the contact members from the support, a source of power connected across the support and the contact members,
   means mounting the horn blowing switch module within the hub portion of the steering wheel with the post member heads aligned with the hub portion apertures,
   an inflatable restraint module located over the support and closing the opening of the hub portion, the restraint module including a series of threaded anchor mean alignable with the threaded end portions of the post members and threadedly connectable therewith to mount the inflatable restraint module to the support, the apertures in the hub portion of the steering wheel providing tool access to the heads of the post members to threadedly connect the post members and anchor means.

7. The combination received in claim 6 wherein post members include a shoulder adjacent the threaded other end portion thereof and each contact member includes an apertured base seating on a shoulder of a respective post member.

* * * * *